(12) United States Patent
Harris

(10) Patent No.: US 8,174,305 B2
(45) Date of Patent: May 8, 2012

(54) SYSTEM, DEVICES AND METHODS FOR COUPLING QUBITS

(75) Inventor: Richard G. Harris, North Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 0 days.

(21) Appl. No.: 12/922,626

(22) PCT Filed: Mar. 13, 2009

(86) PCT No.: PCT/US2009/037156
§ 371 (c)(1),
(2), (4) Date: Sep. 14, 2010

(87) PCT Pub. No.: WO2009/114805
PCT Pub. Date: Sep. 17, 2009

(65) Prior Publication Data
US 2011/0018612 A1    Jan. 27, 2011

Related U.S. Application Data

(60) Provisional application No. 61/036,796, filed on Mar. 14, 2008.

(51) Int. Cl.
*H03K 3/38* (2006.01)
*H01L 39/22* (2006.01)

(52) U.S. Cl. .............. 327/528; 257/312; 257/E39.012

(58) Field of Classification Search ............. None
See application file for complete search history.

(56) References Cited

U.S. PATENT DOCUMENTS

| | | | |
|---|---|---|---|
| 6,984,846 B2 * | 1/2006 | Newns et al. | 257/31 |
| 2005/0001209 A1 * | 1/2005 | Hilton et al. | 257/20 |
| 2005/0045872 A1 | 3/2005 | Newns et al. | |
| 2006/0097747 A1 | 5/2006 | Amin | |
| 2006/0147154 A1 | 7/2006 | Thom et al. | |
| 2006/0225165 A1 * | 10/2006 | Maassen van den Brink et al. | 977/933 |
| 2008/0176750 A1 | 7/2008 | Rose et al. | |
| 2008/0215850 A1 | 9/2008 | Berkley et al. | |
| 2008/0238531 A1 | 10/2008 | Harris | |
| 2008/0274898 A1 | 11/2008 | Johnson et al. | |
| 2009/0078932 A1 | 3/2009 | Amin | |

(Continued)

FOREIGN PATENT DOCUMENTS

JP 2006165812 A 6/2006

OTHER PUBLICATIONS

Harris, "System, Devices and Methods for Coupling Qubits," U.S. Appl. No. 61/036,796, filed Mar. 14, 2008, 25 pages.

(Continued)

*Primary Examiner* — Shawki S Ismail
*Assistant Examiner* — Crystal L Hammond
(74) *Attorney, Agent, or Firm* — Seed IP Law Group PLLC

(57) ABSTRACT

A ladder structure is ferromagnetically coupled to a first qubit where the ladder structure has a monostable energy potential in use, such that the first qubit and the ladder structure effectively operate as a single qubit. The ladder structure and first qubit may be coupled via a superconducting flux coupler. The ladder structure may be a chain of at least two ferromagnetically coupled ladder elements. A value for each ladder element may be less than about 1.

12 Claims, 5 Drawing Sheets

U.S. PATENT DOCUMENTS

2009/0121215 A1      5/2009   Choi

OTHER PUBLICATIONS

Maassen Van Den Brink et al., "Mediated tunable coupling of flux qubits," New Journal of Physics 7:1-18, 2005.

Maibaum et al., "Systems, Devices, and Methods for Analog Processing," U.S. Appl. No. 61/039,710, filed Mar. 26, 2008, 48 pages.

International Search Report, mailed Nov. 20, 2009, for PCT/US2009/037156, 3 pages.

Written Opinion, mailed Nov. 20, 2009, for PCT/US2009/037156, 4 pages.

\* cited by examiner

SYSTEM, DEVICES AND METHODS FOR COUPLING QUBITS

CROSS REFERENCE TO RELATED APPLICATIONS

This application is a U.S. national stage application filed under 35 U.S.C.§371 of International Patent Application PCT/US2009/037156, accorded an international filing date of Mar. 13, 2009, which claims benefit under 35 U.S.C. 119 (e) of U.S. Provisional Patent Application Ser. No. 61/036,796, filed Mar. 14, 2008 and entitled "System, Devices and Methods for Coupling Qubits".

BACKGROUND

1. Field

The present systems, devices and methods generally relate to superconducting computing, for example analog or quantum computing employing processors that operate at superconducting temperatures.

2. Description of the Related Art

Approaches to Quantum Computation

There are several general approaches to the design and operation of quantum computers. One such approach is the "circuit model" of quantum computation. In this approach, qubits are acted upon by sequences of logical gates that are the compiled representation of an algorithm. Much research has been focused on developing qubits with sufficient coherence to form the basic elements of circuit model quantum computers.

Another approach to quantum computation, involves using the natural physical evolution of a system of coupled quantum systems as a computational system. This approach does not make use of quantum gates and circuits. Instead, the computational system starts from a known initial Hamiltonian with an easily accessible ground state and is controllably guided to a final Hamiltonian whose ground state represents the answer to a problem. This approach does not require long qubit coherence times and may be more robust than the circuit model. Examples of this type of approach include adiabatic quantum computation and quantum annealing.

Superconducting Qubits

Superconducting qubits are a type of superconducting quantum device that can be included in a superconducting integrated circuit. Superconducting qubits can be separated into several categories depending on the physical property used to encode information. For example, they may be separated into charge, flux and phase devices. Charge devices store and manipulate information in the charge states of the device. Flux devices store information in a variable related to the magnetic flux through some part of the device. Phase devices store information in a variable related to the difference in superconducting phase between two regions of the phase device. Recently, hybrid devices using two or more of charge, flux and phase degrees of freedom have been developed.

Superconducting integrated circuits may include single flux quantum (SFQ) devices. The integration of SFQ devices with superconducting qubits is discussed in U.S. patent application Ser. No. 11/950,276.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION OF THE INVENTION

Figure 1:
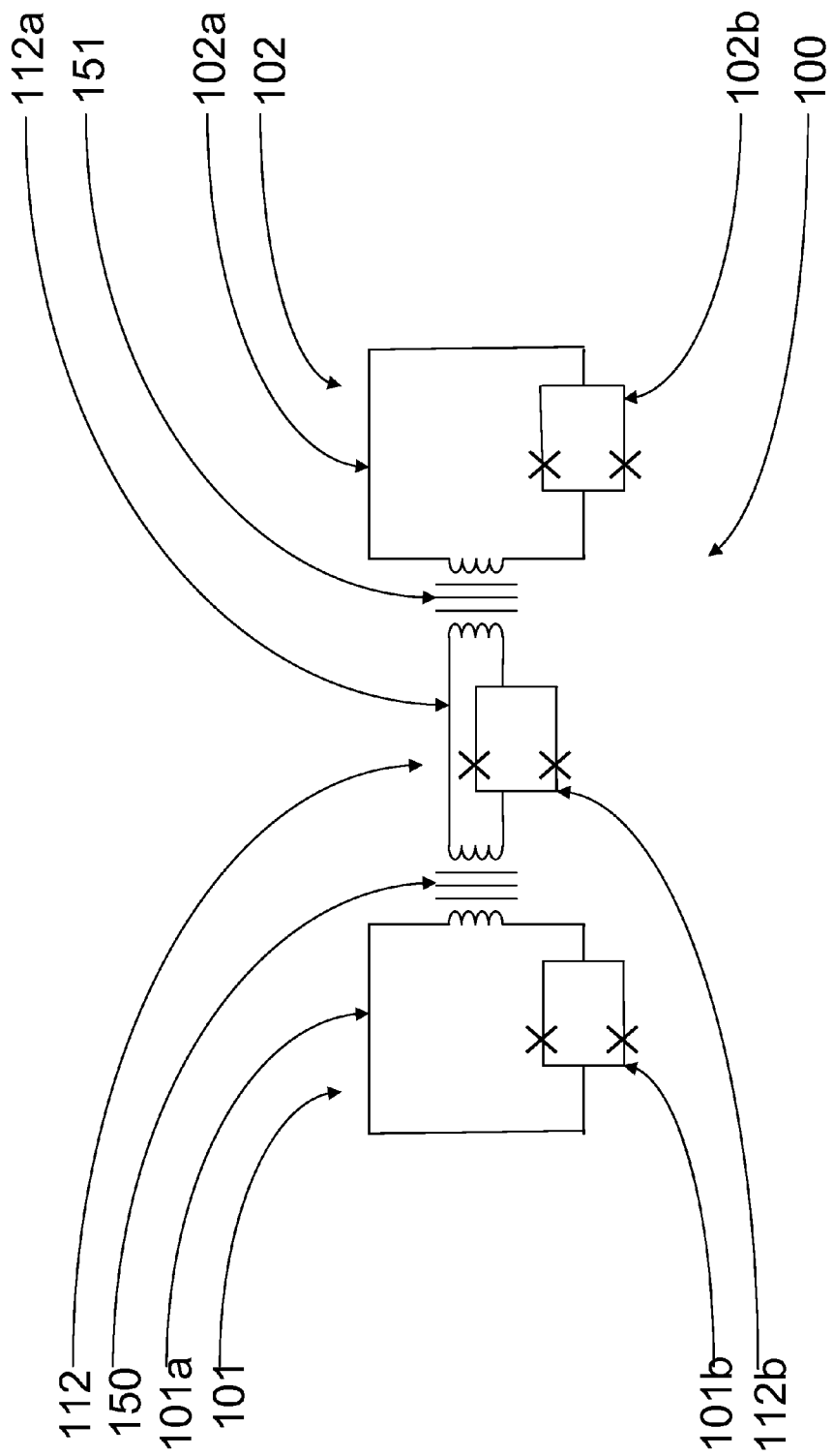
FIG. 1 is a schematic diagram of coupled qubits.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with quantum processors, interfaces, and refrigerators, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

One of the premises behind quantum computer processor architectures proposed in the art (see, e.g.: U.S. Publication No. 2006-0225165, U.S. Publication No. 2008-0176750, U.S. Ser. No. 12/266,378 and U.S. Ser. No. 61/039,710) is the viability of ferromagnetically coupled chains (FMCC) of qubits in order to mediate long range interactions across a lattice and to increase the connectivity of single qubits. The rationale behind this approach is that by providing sufficiently strong ferromagnetic (FM) coupling between qubits in a chain their spins will remain locked parallel and consequently the entire chain may be treated effectively as a single qubit (i.e., an effective qubit). In this case the FMCC becomes an approximate 2-level system since a state of the FMCC has been restricted to reside within that portion of Hilbert space that is spanned by the two ferromagnetically aligned spin states. Thus, connections can hypothetically be made any-where along the length of the FMCC in order to make use of the physically extended effective qubit.

While it may appear to be the case that arbitrarily long FMCC can be formed, there are practical constraints imposed by quantum mechanics. Let the single qubit gap be represented by $\Delta$, the gap of the FMCC effective qubit be represented by g and the magnitude of the FM coupling interaction be represented by $J_{FM}$. The two lowest energy states of a chain of N ferromagnetically coupled qubits can be expressed as mixtures of the two ferromagnetically aligned spin states. In order to ensure that the two lowest levels are indeed as desired, the restriction $g < J_{FM}$ must be satisfied as this ensures that the energy penalty for having a single spin-flip in the spin chain is greater than the gap between ground and first excited state. Furthermore, during quantum annealing where $\Delta \to 0$, the regime $$\frac{\Delta}{J_{FM}} < 1$$

will be reached. In this case it is known that:

$$g = \frac{\Delta^N}{(2J_{FM})^{N-1}} \quad (1)$$

where N is the number of qubits in the FMCC. Thus the gap of the effective qubit can be rapidly suppressed with increasing chain length as $\Delta \to 0$.

In some circumstances g may cause the global gap of a network of qubits to rapidly collapse. This is a serious issue for flux qubits as it is known that qubit persistent current $I_p^q$, and therefore the magnitude of terms in the target Hamiltonian, increase as $\Delta \to 0$. Increased $|I_p^q|$ may result in less sensitivity to flux noise which may improve the performance of a processor. Increasing $|I_p^q|$ may result in increased broadening by flux noise which may thereby increase decoherence. It may be desirable to delay suppression of the global gap until as late as possible during quantum annealing.

Conversion of Qubits into Classical Ladder Elements

The problem imposed by Eq. 1 is due to each qubit in the FM chain having energetics on the relevant energy scale, namely $\Delta$. It is desirable that all auxiliary qubits in an FMCC possess large gaps throughout quantum annealing such that they do not contribute to the energetics of the qubit that is effectively stretched by the FMCC. In such a scenario the auxiliary qubits may behave like couplers seen in U.S. Publication No. 2006-0225165, U.S. Publication No. US 2008-0176750, U.S. Ser. No. 12/266,378 and U.S. Ser. No. 61/039,710, which are based upon monostable rf-SQUIDs. Biasing these auxiliary qubits at their respective degeneracy points may yield FM couplers as described in Maassen van den Brink, A., et al., New J. Phys. 7, 230 (2005).

In a system 100, a pair of qubits 101, 102 linked by a coupler 112 are shown in FIG. 1. Qubits 101, 102 may be superconducting flux qubits. The structure of qubit 101 may be a loop 101a of superconducting material interrupted by a compound Josephson junction 101b. Magnetic flux may thread loop 101a and magnetic flux may thread compound Josephson junction 101b to control the behavior and performance of qubit 101. The structure of qubit 102 may be a loop 102a of superconducting material interrupted by a compound Josephson junction 102b. Magnetic flux may thread loop 102a and magnetic flux may thread compound Josephson junction 102b to control the behavior and performance of qubit 102. A person of skill in the art would appreciate that other superconducting flux qubit designs may be used with little or no effect on the present systems, devices and methods. The structure of coupler 112 may be a controllable superconducting flux coupler capable of producing at least one of: FM couplings, anti-ferromagnetic (AFM) couplings, zero couplings and transverse couplings between two qubits. Coupler 112 may be a loop 112a of superconducting material interrupted by a compound Josephson junction 112b. Magnetic flux may thread loop 112a and magnetic flux may thread compound Josephson junction 112b to control the behavior and performance of coupler 112. A person of skill in the art would appreciate that other qubits and couplers of differing designs may be used with little or no effect on the present systems, devices and methods. For more information on couplers, see, e.g., U.S. Publication No. 2006-0147154, U.S. Publication No. 2008-0238531, U.S. Publication No. 2008-0274898 and U.S. Ser. No. 12/238,147.

The susceptibility of coupler 112 describes its persistent current response to an applied field and may be defined as $$\chi_{co}^{AFM} \equiv \frac{dI_p^{co}}{d\Phi_x^{co}}\bigg|_{AFM},$$

where $I_p^{co}$ is the persistent current flowing in superconducting loop 112a and $\Phi_x^{co}$ is the amount of external flux threading superconducting loop 112a. Mutual inductances 150, 151 linking qubits 101, 102 respectively to coupler 112 may be represented by $M_{co-q}$ and may be approximately equal in magnitude. Following the calculations performed in Maassen van den Brink, A., et al., New J. Phys. 7, 230 (2005) it may be shown that the effective mutual inductance between qubits 101, 102 can be expressed as follows:

$$M_{AFM} = M_{co-q}^2 \chi_{co}^{AFM} \quad (2)$$

While mutual inductances 150, 151 may not be equal, a person of skill in the art would appreciate that mutual inductances 150, 151 of similar magnitudes will result in a system which acts very similarly to one in which mutual inductances 150, 151 are assumed to be approximately equal. Given the above expression, the interaction term in the system's Hamiltonian can be expressed as $J_{AFM} = M_{AFM}(I_p^q)^2$ where $I_p^q$ represents the magnitude of the persistent current of each qubit 101, 102 and is assumed to be about equal for each qubit 101, 102. While the magnitude of the persistent current may differ between qubit 101, 102, those of skill in the art would appreciate that this may not effect the dynamics of the system if the magnitude of the persistent currents within qubits 101, 102 differ by a small amount. In this case the net Hamiltonian of coupled qubit system 100 can be written as:

$$H = \sum_{i=1}^{2} H_Q + J_{AFM} \sigma_z^{(1)} \sigma_z^{(2)} \quad (3)$$

where $H_Q$ represents the single (uncoupled) qubit Hamiltonian and $\sigma_z^{(i)}$ are Pauli matrices.

Figure 2:
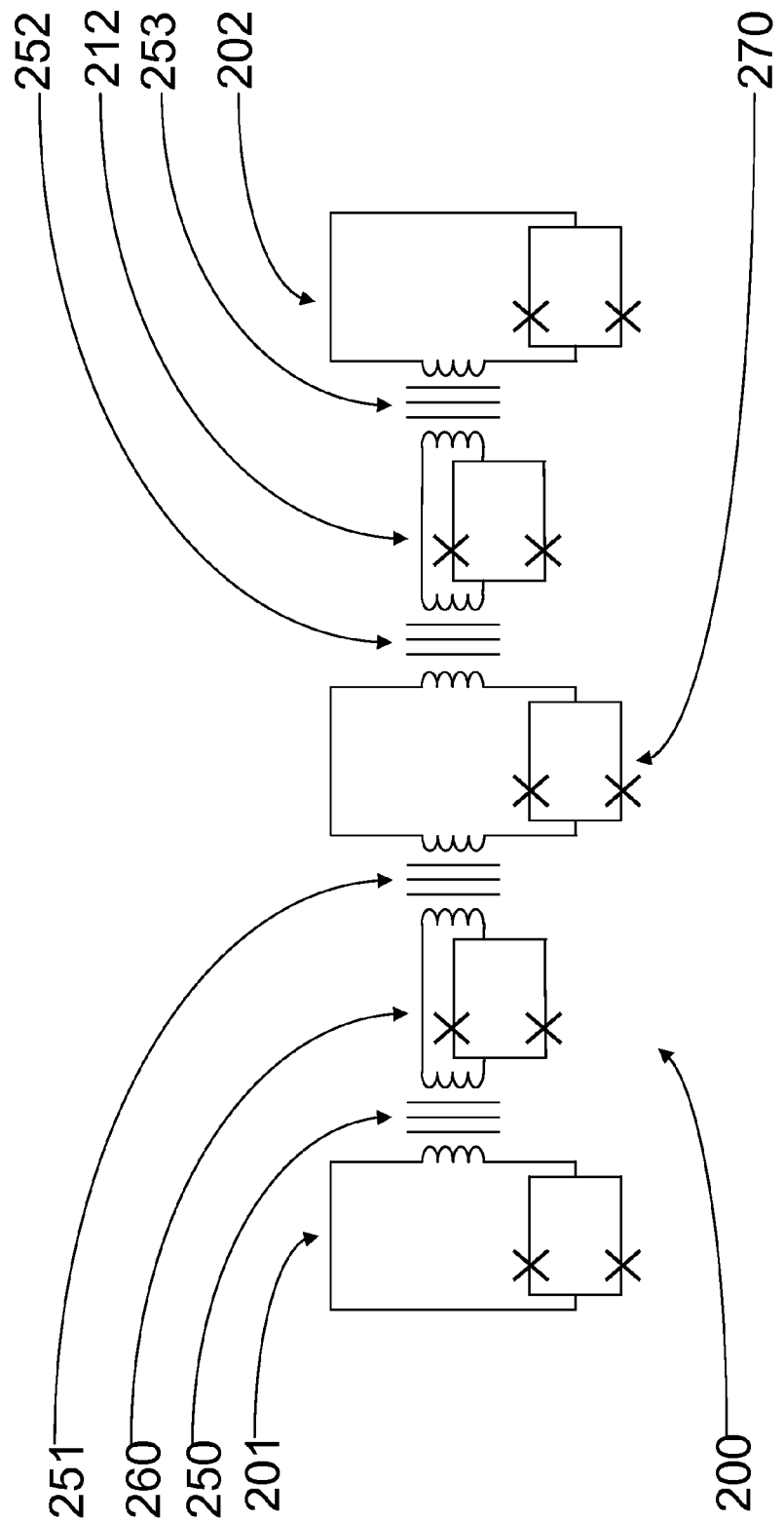
FIG. 2 is a schematic diagram of an embodiment of the present systems, devices and methods.

Consider a system 200 where there is no direct coupler connecting qubits 201, 202 but there is the possibility of mediating an interaction between qubits 201, 202 via a third qubit hereafter referred to as a ladder element 270, as depicted in FIG. 2, and wherein qubit 201 and ladder element 270 compose a logical qubit. Here it may be possible to create an effective AFM interaction between qubits 201, 202 using ladder element 270, an AFM coupler 212 and an FM coupler 260. Ladder element 270 can be rendered monostable such that its susceptibility $\chi_1$ can be defined in the same way as a coupler. Furthermore, let the susceptibility of FM coupler 260 be represented by $\chi_{co}^{FM}$. In this case the effective mutual inductance between qubits 201, 202 may be given by:

$$M_{\text{eff}} = M_{co-q}^4 \chi_1 \chi_{co}^{FM} \chi_{co}^{AFM} \quad (4)$$

Let mutual inductances 250, 251, 252, 253 linking qubit 201 to FM coupler 260, FM coupler 260 to ladder element 270, ladder element 270 to AFM coupler 212 and AFM coupler 212 to qubit 202 respectively be represented by $M_{co-q}$. Note that Eq. 4 would be identical to Eq. 2 should the following condition be satisfied:

$$M_{co-q}^2 \chi_1 \chi_{co}^{FM} \equiv 1 \quad (5)$$

Thus the ladder structure approach may be able to faithfully mediate an AFM interaction between qubits that do not have a direct on-chip coupling. Furthermore, since the presence of the ladder structure is entirely accounted for in the classical parameter $M_{\text{eff}}$, there are no additional terms to add to system's 200 Hamiltonian Eq. 3. The ladder structure approach for extending single qubits may not compromise the gap of a coupled qubit system. This may be contrasted with the FM coupled qubit chain scenario for which the system's Hamiltonian may have to be modified to include a third qubit and a second qubit-qubit interaction.

The dynamics, or energy between the ground state and the first excited state, of ladder element 270 may exist in the energy scale much larger than the energy scale of qubits 201, 202. For example, ladder element 270 may be designed to operate in the energy scale of approximately 10 GHz and higher. The tunneling dynamics, or energy between the ground state and first excited state, of qubit 201 may occur in an energy scale less than 10 GHz, and qubits 201, 202 may interact with the ground state of ladder element 270 which thereby reduces the effect ladder element 270 has on the tunneling dynamics of qubits 201, 202.

Connecting Complex Networks of Qubits

Figure 3A:
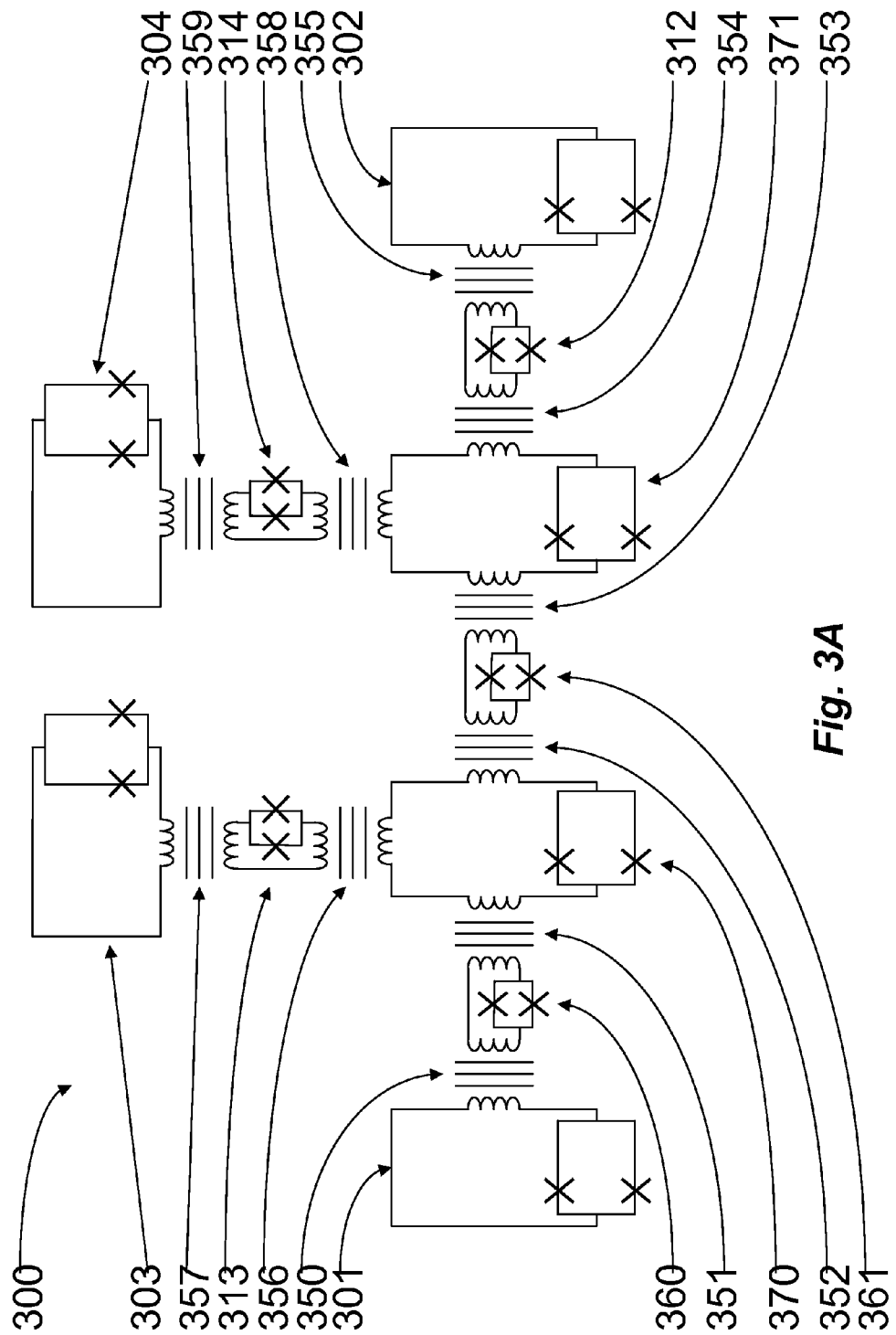
FIGS. 3A, 3B and 3C are schematic diagrams of a further embodiment of the present systems, devices and methods.

The approach discussed in the present systems, devices and methods lends itself well to the creation of longer FM chains that likewise do not degrade the gap of the qubit to which it is attached. As an explicit example consider a system 300 shown in FIG. 3A. There exists a ladder element 370 between qubits 301, 303, just as in the preceding example, but here there exists two ladder elements 370, 371 between qubits 301, 302 and qubits 301, 304. Qubit 301 and ladder elements 370, 371 comprise a logical qubit. The dynamics, or energy between the ground state and the first excited state, of ladder elements 370, 371 may exist in the energy scale much larger than the energy scale of qubits 201, 202. For example, ladder element 270 may be designed to operate in the energy scale of approximately 10 GHz to 20 GHz and higher. The tunneling dynamics, or energy between the ground state and first excited state, of qubits 301, 302, 303, 304 may exist in energy scales less than 10 GHz, and qubits 301, 302, 303, 304 interact with the ground state of ladder elements 370, 371 which may reduce the effect ladder elements 370, 371 have on the tunneling dynamics of qubits 201, 202.

Let mutual inductances 350, 351, 352, 353, 354, 355, 356, 357, 358, 359 linking qubit 301 to an FM coupler 360, FM coupler 360 to ladder element 370, ladder element 370 to an FM coupler 361, FM coupler 361 to ladder element 371, ladder element 371 to a coupler 312, coupler 312 to qubit 302, ladder element 370 to a coupler 313, coupler 313 to qubit 303, ladder element 371 to a coupler 314 and coupler 314 to qubit 304 respectively be represented by $M_{co-q}$. While mutual inductances 350, 351, 352, 353, 354, 355, 356, 357, 358, 359 may not be equal, a person of skill in the art would appreciate that mutual inductances 350, 351, 352, 353, 354, 355, 356, 357, 358, 359 of similar magnitudes will result in a system which acts very similarly to one in which mutual inductances 350, 351, 352, 353, 354, 355, 356, 357, 358, 359 are assumed to be approximately equal. The effective mutual inductance between qubits 301, 302 and qubits 301, 304 will be:

$$M_{\text{eff}} = M_{co-q}^6 [\chi_1 \chi_{co}^{FM}]^2 \chi_{co}^{AFM} \rightarrow M_{co-q}^2 \chi_{co}^{AFM} = M_{AFM} \quad (6)$$

where the last step follows from Eq. 5. Note that the effective mutual inductance 313b between qubits 301, 303 is also $M_{\text{eff}} = M_{co-q}^2 \chi_{co}^{AFM}$ from Eq. (4) and Eq. (5). Thus it may be seen that ladder elements may indeed be connected in series and may result in the same effective mutual inductance.

Ladder elements may exist within a large array of qubits such as those described in U.S. Publication No. 2006-0225165, U.S. Publication No. US 2008-0176750, U.S. Ser. No. 12/266,378 and U.S. Ser. No. 61/039,710. Ladder elements within large arrays of qubits may allow for qubits within the large array of qubits to allow for couplings between qubits which would not be possible without ladder elements either due a combination of noise due to coupling multiple qubits and a lack of physical proximity.

Figure 3B:
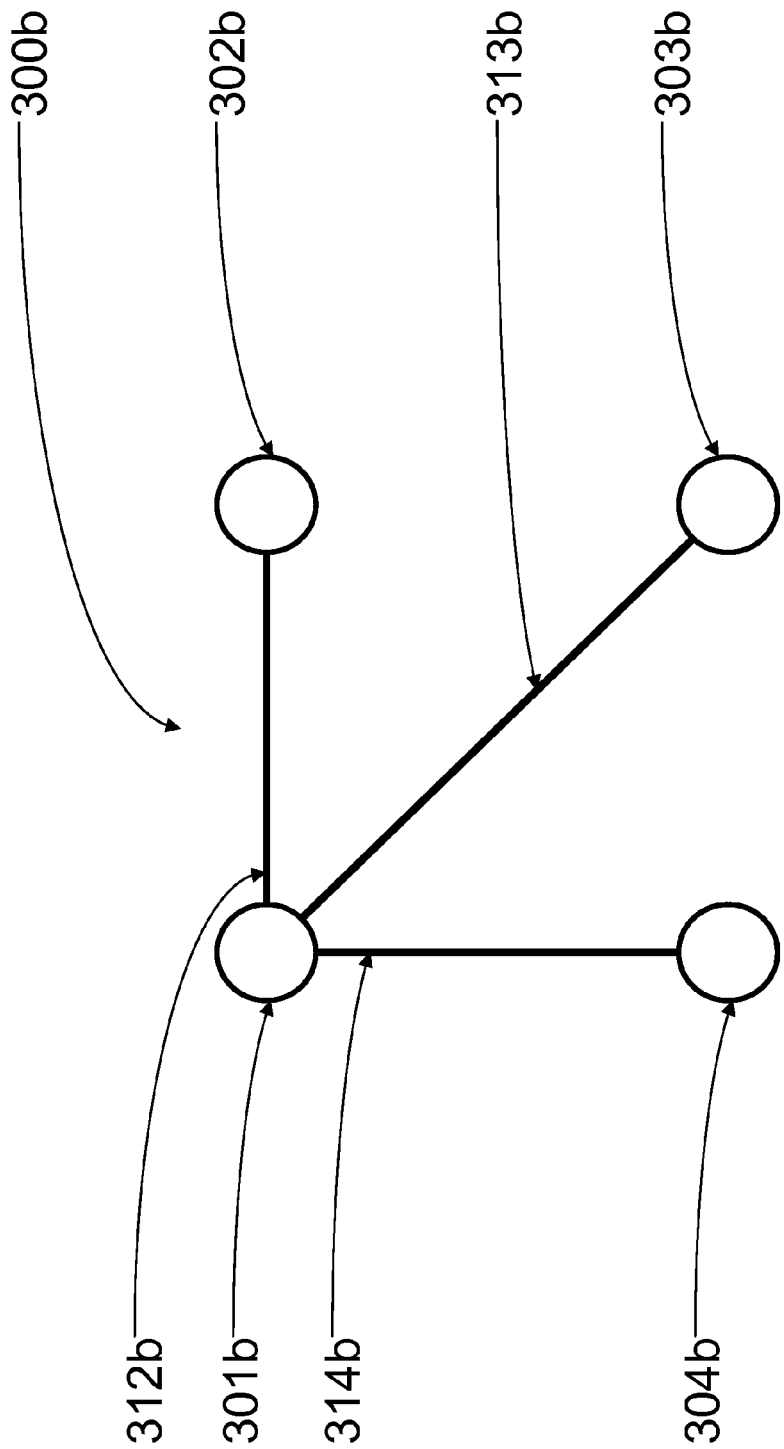
Figure 3C:
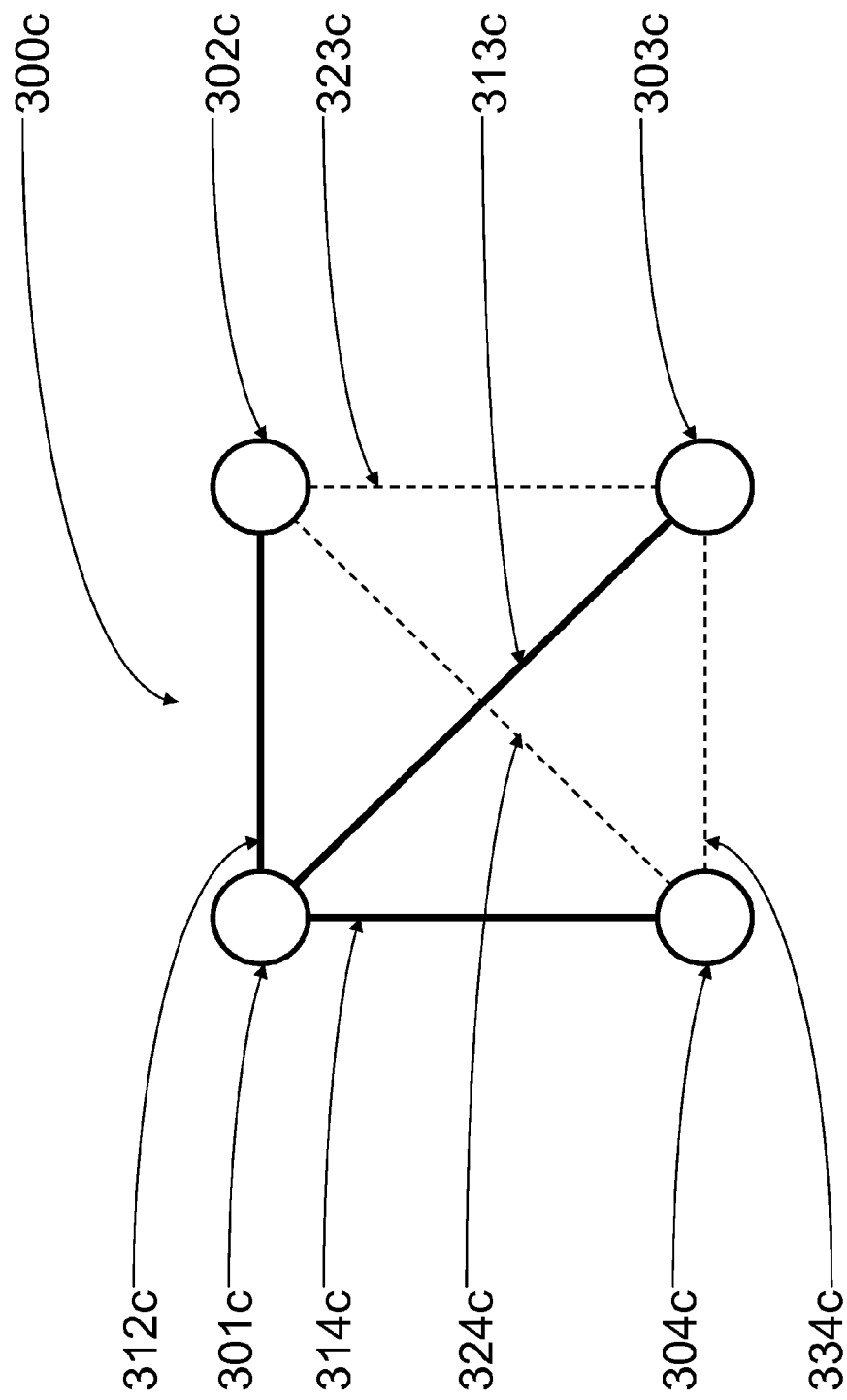

While the ladder structure approach described in the present systems, devices and methods may facilitate the use of ferromagnetically linked chains of qubits, it does introduce unbidden inter-qubit interactions. As a specific example consider system 300 shown as a graph 300b in FIG. 3B in which there are AFM edges 312b, 313b, 314b between pairs of vertices 301b, 302b, vertices 301b, 303b, and vertices 301b, 304b respectively. System 300 of FIG. 3A may be shown schematically as graph 300b of FIG. 3B since there may exist similar AFM interactions between qubits 301, 302, qubits 301, 303 and qubits 303, 304 as mediated by ladder elements 370, 371. However, the classical circuit elements (ladder elements 370, 371) may mediate effective interactions between all qubits and logical qubits that communicate with the ladder structure. In this particular case the effective mutual inductance between qubits 303, 304 may be:

$$M_{\text{eff}} = M_{co-q}^6 [\chi_{co}^{AFM}]^2 \chi_{co}^{FM} \rightarrow M_{co-q}^4 \chi_1 [\chi_{co}^{AFM}]^2 \equiv M_{\text{error}} \quad (7)$$

where Eq. 5 has been used to simplify the expression. The effective mutual inductance between qubits 302, 303 and qubits 302, 304 may similarly be $M_{\text{eff}} = M_{co-q}^4 \chi_1 [\chi_{co}^{AFM}]^2 = M_{\text{error}}$. The net interaction in the latter two cases may be FM due to the even power of $\chi_{co}^{AFM}$ terms and this may be true for all unbidden interaction terms generated by the chain. Furthermore it may be shown that all such interactions may have the same magnitude as given in Eq. 7 provided Eq. 5 is satisfied. Thus graph 300c illustrated in FIG. 3C may have three FM edges or interactions 323c, 324c, 334c (shown as dashed lines) in addition to the intended AFM edges or interactions 312c, 313c, 314c (shown as solid lines), as is shown in FIG. 3B.

Given the presence of unbidden FM edges 323c, 324c, 334c, one question that may exist is whether the magnitude of $M_{\text{error}}$ as given in Eq. 7 is significant. One way to assess this is to divide Eq. 7 by the magnitude of an intended AFM edges

323c, 324c, 334c given by Eq. 2, which generates the following dimensionless quantity:

$$\frac{M_{error}}{M_{AFM}} \equiv M_{co-q}^2 \chi_l \chi_{co}^{AFM} \quad (8)$$

To establish a baseline, the magnitude of this quantity for parameters that are in a vicinity of what may be currently practiced in the art may be considered. A rough approximation of $\chi_{co}^{AFM}$ may be $$\chi_{co}^{AFM} \sim \frac{2I_c^{co}}{\Phi_0},$$

where $I_c^{co}$ is the critical current of coupler 312, 313, 314, which may be on the order of approximately 1 μA. A person of skill in the art would appreciate that couplers with critical currents higher or lower than approximately 1 μA may be suitable to utilize in the present systems, devices and methods. Furthermore, the susceptibility of ladder element 370, 371 may be modeled as $$\chi_l \approx \left(\frac{2\pi}{\Phi_0}\right)\frac{I_c^l}{1-\beta_l}$$

where $I_c^l$ is the critical current of ladder element 370, 371, again which may be on the order of approximately 1 μA, and $$\beta_l = \frac{2\pi L I_c^l}{\Phi_0} \sim 0.9$$

may be a reasonable target $\beta_l$ for which ladder element 370, 371 may be monostable (as opposed to operating as qubits 301, 302, 303, 304 with bistable energy potential). A person of skill in the art would appreciate that a $\beta_l$ lower than approximately 1 may be suitable to utilize in the present systems, devices and methods and that $\beta_l$ is the parameter related to control over the tunneling amplitude between the two states of a bistable qubit. A person of skill in the art would appreciate that $\beta_l$ greater than approximately 1 may be suitable to utilize in bistable devices such as qubits 301, 302, 303, 304. A person of skill in the art would appreciate that ladder elements 370, 371 with critical currents higher or lower than approximately 1 μA may be suitable to utilize in the present systems, devices and methods. A person of skill in the art would appreciate that a β higher or lower than approximately 0.9 may be suitable to utilize in the present systems, devices and methods. Finally $M_{co-q}$ may be assumed to be approximately 30 pH. A person of skill in the art would appreciate that mutual inductances $M_{co-q}$ greater or less than approximately 30 pH may be suitable to utilize in the present systems, devices and methods.

By inserting the approximations above into Eq. 8, $$\frac{M_{error}}{M_{AFM}} \sim O(10^{-1})$$

is obtained. Thus the unintended FM interactions 323c, 324c, 334c may be considered perturbative relative to the intended AFM interactions 312c, 313c, 317c. The magnitude of the FM interactions 323c, 324c, 334c may further be reduced by choosing slightly different device parameters, though Eq. 5 may still need to be satisfied. For the approximations above, the couplers may have to be capable of providing FM/AFM ratio of $$\frac{\chi_{co}^{FM}}{\chi_{co}^{AFM}} \sim 10$$

to 100.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other analog processor based systems, not necessarily the exemplary quantum processor based system generally described above.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications, including but not limited to US Provisional Patent Application Ser. No. 61/036,796, filed Mar. 14, 2008 and entitled "System, Devices and Methods for Coupling Qubits", assigned to the assignee of this application are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:

1. A method of coupling qubits, the method comprising:
    biasing a first qubit into a first bistable energy potential;
    biasing a second qubit into a second bistable energy potential;
    biasing each ladder element in a chain of ferromagnetically coupled ladder elements into a respective monostable energy potential, wherein each ladder element includes a respective qubit;
    ferromagnetically coupling the first qubit to a first end of the chain of ferromagnetically coupled ladder elements such that the first qubit and the chain of ferromagnetically coupled ladder elements operate as a single effective qubit; and
    coupling the second qubit to a second end of the chain of ferromagnetically coupled ladder elements.

2. The method of claim 1 wherein biasing each ladder element in a chain of ferromagnetically coupled ladder elements into a respective monostable energy potential includes biasing each ladder element to have a respective $\beta_l$ value less than about 1.

3. The method of claim 1 wherein biasing a first qubit into a first bistable energy potential includes biasing the first qubit to have a $\beta_I$ value greater than about 1, and biasing a second qubit into a second bistable energy potential includes biasing the second qubit to have a $\beta_I$ value greater than about 1.

4. The method of claim 1, further comprising:
   biasing a third qubit into a third bistable energy potential; and
   coupling the third qubit to one of the ladder elements in the chain of ferromagnetically coupled ladder elements.

5. The method of claim 1 wherein at least one of the first qubit and the second qubit includes a loop of superconducting material interrupted by at least one Josephson junction.

6. The method of claim 5 wherein the first qubit includes a loop of superconducting material interrupted by a compound Josephson junction and biasing the first qubit into a first bistable energy potential includes biasing the compound Josephson junction of the first qubit.

7. The method of claim 1 wherein each qubit in each respective ladder element in the chain of ferromagnetically coupled ladder elements includes a respective loop of superconducting material, each loop interrupted by at least one Josephson junction.

8. The method of claim 7 wherein each qubit in each respective ladder element in the chain of ferromagnetically coupled ladder elements includes a respective compound Josephson junction and biasing each ladder element in a chain of ferromagnetically coupled ladder elements into a respective monostable energy potential includes biasing the respective compound Josephson junction in each respective ladder element.

9. The method of claim 1 wherein tunneling dynamics of the first qubit occur at a lower energy than tunneling dynamics of the chain of ferromagnetically coupled ladder elements.

10. The method of claim 1 wherein coupling the second qubit to a second end of the chain of ferromagnetically coupled ladder elements includes anti-ferromagnetically coupling the second qubit to the second end of the chain of ferromagnetically coupled ladder elements.

11. The method of claim 1 wherein ferromagnetically coupling the first qubit to a first end of the chain of ferromagnetically coupled ladder elements includes ferromagnetically coupling the first qubit to the first end of the chain of ferromagnetically coupled ladder elements via a superconducting flux coupler.

12. The method of claim 11 wherein coupling the second qubit to a second end of the chain of ferromagnetically coupled ladder elements includes coupling the second qubit to the second end of the chain of ferromagnetically coupled ladder elements via a superconducting flux coupler.

* * * * *